(12) United States Patent
Sharma et al.

(10) Patent No.: US 10,939,695 B2
(45) Date of Patent: Mar. 9, 2021

(54) SAVOURY CONCENTRATES WITH A FLOWABLE TEXTURE BASED ON TWO STARCHES

(71) Applicant: NESTEC S.A., Vevey (CH)

(72) Inventors: Elena Sharma, Singen (DE); Sanyasi Gaddipati, Singen (DE); Fritz Wilhelm Nueckel, Singen (DE); Paulina Gorecka, Singen (DE); Catherine Barbier, Utrecht (NL); Lara Harttung, Constance (DE)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 15/760,267

(22) PCT Filed: Sep. 16, 2016

(86) PCT No.: PCT/EP2016/071928
§ 371 (c)(1),
(2) Date: Mar. 15, 2018

(87) PCT Pub. No.: WO2017/046301
PCT Pub. Date: Mar. 23, 2017

(65) Prior Publication Data
US 2018/0249748 A1 Sep. 6, 2018

(30) Foreign Application Priority Data

Sep. 18, 2015 (EP) .................................... 15185947

(51) Int. Cl.
| | | |
|---|---|---|
| *A23L 29/212* | (2016.01) | |
| *A23L 23/00* | (2016.01) | |
| *A23L 27/00* | (2016.01) | |
| *A23L 23/10* | (2016.01) | |

(52) U.S. Cl.
CPC .............. *A23L 29/212* (2016.08); *A23L 23/00* (2016.08); *A23L 23/10* (2016.08); *A23L 27/00* (2016.08); *A23V 2002/00* (2013.01)

(58) Field of Classification Search
CPC ........ A23L 29/212; A23L 27/00; A23L 23/00; A23L 23/10; A23V 2002/00

USPC .......................................................... 426/589
See application file for complete search history.

(56) References Cited

U.S. PATENT DOCUMENTS

| | | | |
|---|---|---|---|
| 5,538,751 A * | 7/1996 | Carter .................. | A23C 9/1542 |
| | | | 426/573 |
| 2010/0003392 A1 | 1/2010 | Achterkamp et al. | |
| 2010/0099648 A1 | 4/2010 | Debon et al. | |
| 2013/0022711 A1 | 1/2013 | Ichihara et al. | |
| 2013/0236623 A1 | 9/2013 | LaGarrigue et al. | |
| 2013/0309385 A1 | 11/2013 | Perrine et al. | |
| 2014/0141146 A1 | 5/2014 | Wang et al. | |
| 2014/0287130 A1 | 9/2014 | Drew et al. | |

FOREIGN PATENT DOCUMENTS

| | | |
|---|---|---|
| EP | 0813819 A1 | 12/1997 |
| WO | 2007068484 A1 | 6/2007 |
| WO | 2014053287 | 4/2014 |
| WO | 2014053288 | 4/2014 |
| WO | 2015013671 A1 | 1/2015 |
| WO | 2015090910 | 6/2015 |

OTHER PUBLICATIONS

Treewoman, Better than Bouillon Gravy, Food.com https://www.food.com/recipe/quot-better-than-bouillon-quot-gravy-511799, Apr. 4, 2020.*

Easy Gravy, Cooking Classy, https://www.cookingclassy.com/easy-gravy/ Nov. 9, 2017.*

Colombia Patent Office Communication for Application No. NC2018/0002067, dated Nov. 23, 2020, 27 pages.

* cited by examiner

*Primary Examiner* — Jyoti Chawla
(74) *Attorney, Agent, or Firm* — K&L Gates LLP

(57) ABSTRACT

The invention relates to a composition in form of a flowable texture for preparing a food product, to a process for preparing a food product, and to the use of the composition for preparing a food product. In particular, the invention relates to a flowable composition comprising a first starch which is gelatinized and a second starch which is an ungelatinized starch for preparing savoury food products such as bouillons, condiments, seasonings, sauces, gravies, stews, pan-fried dishes or soups.

10 Claims, No Drawings

SAVOURY CONCENTRATES WITH A FLOWABLE TEXTURE BASED ON TWO STARCHES

CROSS REFERENCE TO RELATED APPLICATIONS

The present application is a National Stage of International Application No. PCT/EP2016/071928, filed on Sep. 16, 2016, which claims priority to European Patent Application No. 15185947.7, filed on Sep. 18, 2015, the entire contents of which are being incorporated herein by reference.

The invention relates to a composition with a flowable texture for preparing a food product, to a process for preparing a composition for preparing a food product, and to the use of the composition for preparing a food product. In particular, the invention relates to a composition with a flowable texture comprising a gelatinized starch and an un-gelatinized starch for preparing savoury food products such as bouillons, condiment, seasoning, sauces, gravies, stews, pan-fried dishes or soups.

Concentrated food products, such as dehydrated gravies and sauces, and bouillon or stock cubes, have been known for many years. Savoury dehydrated products are becoming increasingly unattractive to consumers due to a perception that they are not natural, they have an old fashioned image, and they have an artificial appearance. Some products have a pasty texture, but these are typically fat-based and therefore have a high fat content and consequently a poor health or nutritional profile. In the search for alternative product types having different characteristics and advantages over traditional food concentrates, food compositions concentrated in gel form have been developed. A number of such products are now known. They are typically based on the combinations of two hydrocolloid polysaccharides. For example, WO 2007/068484, WO 2008/151850, WO 2008/151851, WO 2008/151852, WO 2008/151853, WO 2012/062919 describe a combination of xanthan and various galactomannans (locust bean gum, tara gum, guar gum, cassia gum) or konjac gum or carrageenan as gelling agents. WO2014/053288 describe a gel using a combination of carrageenan/xanthan as gelling agents and an un-gelatinized starch for preparing a sauce or soup. One problem is that these combinations, when used to make a soup or sauce, are still able to form a gel during cooling. This can lead to a re-gelification texture during consumption of the product when the dish is cooling. There is still a need for a composition which does not (re-)gel during the normal food consumption times. Another problem is that the gel-forming compositions do dissolve slowly during product preparation (during a standard heating step or during dilution of the gel composition in hot water).

Nevertheless also gel compositions are perceived as being un-natural by the consumer. Jelly in general is associated by the consumer with additional process step of jellifying the liquid and this lowers the natural perception due to perceived unnecessary ingredients and more processing in factory. Additionally gel compositions are perceived as difficult to customize the dosing by the consumer as the gel discharges from the packaging in one piece.

There is a persisting need for a composition having a texture different of a gel reaching the consumer preferences and using a thickener agent, which provide a regulatory labeling well perceived by the consumer. Additionally the composition should be able to dissolve instantly during product preparation (during a standard heating step or during dilution of the composition in hot water), has a natural appearance, can be dosed individually and distributed evenly on the ingredients of the final dish by the consumer. In case of a pan frying product preparation step a coating to the ingredients in the final dish and an optimal amount of sauce should be provided to the consumer. The coating of ingredients in the final dish has the advantage that it is perceived as more juicy and tasty. In case of preparing a bouillon by dissolution the composition in water a clear or slightly opaque but not turbid final dish should be achieved with visible herbs on the top of the surface.

The object of the present invention is to improve the state of the art and to provide a composition with a flowable texture that at least goes part way overcoming one or more of the above mentioned disadvantages of existing gel compositions or at least provides a useful alternative.

Particularly, the objective is to provide a composition with a flowable texture which: i) dissolves easily in hot water or hot food; ii) does not reform a gel upon cooling of a prepared food-dish; iii) does not make use of an additive such as polyols, which may not be favourably perceived by consumers; iv) does not form film/burnings by direct contact with a hot pan; v) is perceived healthy/natural by the consumers; vi) does not need xanthan; vii) shows no syneresis under normal storage conditions (20-30° C.) after 3 months; viii) is not a gel; ix) has a natural appearance to consumer; x) has a free flowable texture; xi) provide a coating to the ingredients after a pan frying product preparation; xii) can be distributed evenly on the ingredients of the final dish; xiii) is discharging easily from the pack; xiv) provide a clear or slightly opaque bouillon with herbs on the top of the surface when dissolved in hot water; xv) avoid a turbid bouillon with herbs sinking to the bottom when dissolved in hot water; xvi) avoid forming lumps during preparing a food product within a pan application; xvii) avoid sticking to a pan during a food product preparation.

The objective of the present invention is achieved by the subject matter of the independent claims. The dependent claims further develop the idea of the present invention.

Accordingly, the present invention provides in a first aspect a composition for preparing a food product, the composition comprising:
 i) water in an amount of 40 to 70% (by weight of the total composition),
 ii) flavourings in an amount of 1 to 30% (by weight of the total composition),
 iii) salt in an amount of 10 to 25% (by weight of the total composition),
 iv) a first starch, which is a gelatinized modified starch or a gelatinized waxy rice starch or a combination thereof,
 v) a second starch, which is a un-gelatinized starch in an amount of 3 to 9% (by weight of the total composition);
 wherein the composition is not a gel and has a flowable texture with a viscosity in the range of 15 to 120 Pa·s at a shear rate of 1 s-1 at 25° C.

In a second aspect, the invention pertains to a process for preparing a composition for preparing a food product comprising the steps:
a) mixing a first starch, which is a gelatinized modified starch, or a waxy rice starch, or a combination thereof in water at a temperature below 60° C.;
b) heating the mixture of step a) to a temperature of at least 85° C., preferably to at least 90° C. and maintain the temperature for at least 2 min to cook the starch;
c) adding salt in an amount of 10 to 25% (by weight of the total composition) and adding ingredients which are not heat sensitive or need a pasteurization and adding flavourings in an amount of 1 to 30% (by weight of the total composition) and mixing further;

d) pasteurizing the mixture of step c) at a temperature of at least 70° C., preferably of at least 75° C.;

e) cooling the mixture after pasteurization to a temperature within the range 20° C. to 60° C., preferably 25° C. to 50° C., more preferably 30° C. to 45° C., and more preferably 37° C. to 43° C.;

f) adding a second starch, which is an un-gelatinized starch in an amount of 3.0 to 6.5% (by weight of the total composition) to the mixture of step e) after the cooling, mixing further to form the composition and filling the package;

wherein the composition is not a gel and has a flowable texture with a viscosity in the range of 15 to 120 Pa·s at a shear rate of 1 s-1 at 25° C.

In a further preferred embodiment of the process, an un-gelatinized starch is added in the form of a solid powder or in the form of a slurry of starch in oil. This has the advantage that they are industrially feasible and convenient forms of adding un-gelatinized starch to a composition.

A third aspect of the invention is a use of the composition according to the claim 1 for the preparation of a food product.

A still further aspect of the invention is a food product comprising the composition according to claim 1.

In an embodiment the present invention provides a composition for preparing a food product, the composition comprising:

i) water in an amount of 40 to 70% (by weight of the total composition), ii) flavourings in an amount of 1 to 30% (by weight of the total composition), iii) salt in an amount of 10 to 25% (by weight of the total composition), iv) a first starch, which is a gelatinized starch, v) a second starch, which is a un-gelatinized starch in an amount of 3 to 9% (by weight of the total composition);

wherein the composition is not a gel and has a flowable texture with a viscosity in the range of 15 to 120 Pa·s at a shear rate of 1 s-1 at 25° C.

In an embodiment the invention pertains to a process for preparing a composition for preparing a food product comprising the steps:

a) mixing a first starch, which is a gelatinized starch in water at a temperature below 60° C.;

b) heating the mixture of step a) to a temperature of at least 85° C., preferably to at least 90° C. and maintain the temperature for at least 2 min to cook the starch;

c) adding salt in an amount of 10 to 25% (by weight of the total composition) and adding ingredients which are not heat sensitive or need a pasteurization and adding flavourings in an amount of 1 to 30% (by weight of the total composition) and mixing further;

d) pasteurizing the mixture of step c) at a temperature of at least 70° C., preferably of at least 75° C.;

e) cooling the mixture after pasteurization to a temperature within the range 20° C. to 60° C., preferably 25° C. to 50° C., more preferably 30° C. to 45° C., and more preferably 37° C. to 43° C.;

f) adding a second starch, which is an un-gelatinized starch in an amount of 3.0 to 6.5% (by weight of the total composition) to the mixture of step e) after the cooling, mixing further to form the composition and filling the package;

wherein the composition is not a gel and has a flowable texture with a viscosity in the range of 15 to 120 Pa·s at a shear rate of 1 s-1 at 25° C.

It has now been found by the inventors that a combination of a first starch, which is a gelatinized starch (preferably a modified starch, or a native starch, which is high resistance to heat and shear or combination thereof, more preferably a modified starch) and a second starch, which is an un-gelatinized starch in a composition with water, flavourings and salt has certain desirable and surprising characteristics. It forms a flowable texture, is easily dosed into packaging containers, showed no syneresis under normal storage conditions (20-30° C.) after 3 months, is easily diluted in hot water, does not readily re-form a gel on cooling and provides a coating to the ingredients after a pan frying product preparation and provides a clear or slightly opaque bouillon with herbs on the top of the surface if dissolved in water.

The first starch delivers a thickening during the preparation of the composition by acting as a thickening agent to give a free flowable texture to the composition. The second starch is an un-gelatinized starch and must remain in an un-swollen, semi-crystalline state during preparation of the composition. This is so that the coating function of the starch is preserved until such time as a user or a consumer at home adds the composition to cooked meat or cooked vegetables or combination thereof in a hot pan and cooks it for a few minutes. The un-gelatinized starch then provides the desired coating to meat or chicken or seafood or vegetables or combination thereof in pan frying application. The un-gelatinized starch used for the preparation of the composition can be selected according to a specific gelatinisation/pasting profile so that it can be incorporated into the composition at a temperature below the gelatinising (or swelling) temperature.

Surprisingly it has been found that a flowable texture can be obtained with a first starch which is gelatinized. A composition with a flowable texture has a much faster dissolution time in hot water (70° C.) and/or a hot pan (150° C.). Additionally the amount of a second starch, which is an un-gelatinized starch in an amount of 3 to 9% (by weight of the total composition) delivers surprising effects for a pan frying method and for preparation of a bouillon. It provides a coating to the ingredients after a pan frying product preparation and provides a clear or slightly opaque bouillon with herbs on the top of the surface if dissolved in water. In case the amount of an un-gelatinized starch is less than 3% (by weight of the total composition) a coating of the ingredients in the final dish with a pan frying method is too less and the amount of sauce is too high and too liquid. In case the amount of an un-gelatinized starch is more than 9% (by weight of the total composition) a bouillon prepared by dissolution the composition in hot water has a turbid appearance with herbs sinking to the bottom of the bouillon.

The term "gel", in the context of this invention, means a solid or semi-solid material that comes out of the packaging in one piece. Once removed from the packaging, it does not flow on a time scale of a few minutes. The product is able to keep its shape over a time scale of a few minutes. The peak positive force of a jellified product is at least 15 g at a maximum distance of 8 mm. In one embodiment the texture is flowable and not a gel. In one embodiment the texture is flowable and not a gel and not a liquid.

The term "flowable texture" means the mass of the composition change its shape against gravity on a time scale of a less than one minute. In one embodiment the composition is pasty. The peak positive force of a flowable texture should be between 5 to 15 g at a maximum distance of 8 mm.

In case the peak positive force is below 5 g at a maximum distance of 8 mm the composition will be too liquid and in case the peak positive force will be above 15 g the composition will be a gel at a maximum distance of 8 mm. The viscosity of the free flowable composition of one embodiment should be in a range of 15 to 120 Pa·s at a shear rate of 1s-1 at 25° C., measured by using a Rheometer. Preferably, the cooking aid has a viscosity from ca. 15 to 100 Pa·s at a shear rate of 1s-1 at 25° C., preferably the cooking aid has a viscosity from ca. 20 to 80 Pa·s at a shear rate of 1s-1 at 25° C., more preferably the cooking aid has a viscosity from ca. 24 to 60 Pa·s at a shear rate of 1s-1 at 25° C. Cooking aids with higher viscosities, i.e. a viscosity above ca. 120 Pa·s form gel textures, are not preferred for the composition of the present invention. Cooking aids with lower viscosities, i.e. a viscosity below ca. 15 Pa·s are too liquid and not preferred for the composition of the present invention.

The term "peak positive force" relates to the deformation force needed to break a gel or to the maximum positive force observed at a maximum distance of 8 mm measured by a texture analyser.

The term "flavourings" in the context of the composition means flavouring agents, taste enhancing ingredients, herbs, spices, vegetables, meat and fish components (in wet or powder form), acidic components, caramel. Taste enhancing ingredients may be provided by monosodium glutamate (MSG) or yeast extract or combination thereof etc. Acidic components may be provided by citric acid or vinegar or combination thereof.

The term "sugar" in the context of this invention means sugar or glucose syrup or combination thereof, which are suitable for being used in a food product or food concentrate product. In a further embodiment, the composition comprises sugar in the range 0.5 to 6% (by weight of the total composition), preferably from 0.5 to 4%, preferably from 1 to 4% (by weight of the total composition).

"Salt" refers to any suitable alkali metal salt or mixture thereof. In one embodiment the salt used in the composition is typically, but not limited to, sodium chloride. For example, potassium chloride may be used or any low-sodium product having a taste impression of sodium chloride may be used, as long as the taste in the end formulation is acceptable. In a further embodiment, the composition comprises salt in the range 10 to 25% (by weight of the total composition), preferably from 12 to 23%, preferably from 14 to 20%, preferably from 14 to 19%, preferably from 14 to 18%, preferably from 13 to 15%, more preferably from 15 to 17% (by weight of the total composition).

The term "gelatinized starch" refers to starch which is swollen and lost it's semi-crystalline state. These starches show no birefringence, due to the absence of maltese crosses when examined under the microscope with a polarized light. In one embodiment the "gelatinized starch" is a modified starch or a waxy rice starch. In one embodiment the "gelatinized starch" is a modified starch. The term "modified starch" refers to a physically modified or chemically modified starch, preferably physically modified starch which is high resistance to heat and shear or combination thereof. In one embodiment of the composition "modified starch" includes physically modified waxy corn starch or physically modified tapioca starch or physically modified potato starch or combination thereof. In one embodiment the composition comprises gelatinized starch in the range 1.5 to 5% by weight of the total composition, preferably from 1.5 to 4.5%, preferably from 1.5 to 4%, preferably from 2 to 4%, by weight of the total composition.

The term "un-gelatinized starch" refers to starch that is in a native or hybrid variety, un-swollen, semi-crystalline state. These Starches show birefringence, due to the presence of maltese crosses when examined under the microscope with a polarized light. During cooking the un-gelatinized starch starts to absorb water which results in swelling of the starch granules, loss of birefringence, results in the gelatinization of the starch and on cooling the gelatinized starch increase the viscosity and results in product coating of vegetables or meat or chicken or sea food or combination thereof on the final dish. The starch or mixtures of starches are selected among un-gelatinized modified starch or un-gelatinized native starch or combination thereof. Un-gelatinized modified starch refers to a physically modified or chemically modified starch, preferably physically modified starch. In one embodiment the starch or mixtures of starches are selected among such as corn starch, potato starch, waxy potato starch, tapioca, pea starch, rice starch, waxy rice starch, physically modified starches such as annealed or heat-moisture treated starch, preferably heat-moisture treated potato starch, waxy corn or tapioca starch or combination thereof that have a higher gelatinization temperature and process stability, or combination thereof.

Corresponding flours can also be used as a source of starch.

Similar to the starches corresponding flours can be native or physically modified flours from the same botanical origin and variety. The person skilled in the art is calculating based on the amount of starch how much flour has to be used to fall within this invention.

In one embodiment the composition comprises a first starch, which is a gelatinized starch. The gelatinized starch is a physically modified starch or waxy rice starch (Remyline XS) or combination thereof. In one embodiment the composition comprises gelatinized starch in the range 1.5 to 5% by weight of the total composition, preferably from 1.5 to 4.5%, preferably from 1.5 to 4%, preferably from 2 to 4%, by weight of the total composition.

In one embodiment the composition comprises a first starch, which is a gelatinized starch. The gelatinized starch is a modified starch. In one embodiment the composition comprises gelatinized starch in the range 1.5 to 5% by weight of the total composition, preferably from 1.5 to 4.5%, preferably from 1.5 to 4%, preferably from 2 to 4%, by weight of the total composition.

In one embodiment the composition comprises a second starch, which is an un-gelatinized starch. In one embodiment the composition comprises an un-gelatinized starch in the range 3.0 to 9% by weight of the total composition, preferably from 3.5 to 8.5%, preferably from 3.5 to 8.0%, preferably from 3.5 to 7.5%, preferably from 4 to 7.5% by weight of the total composition.

The composition may comprise further ingredients selected from lipids. The lipids may be provided by oils, creamer, vegetable or animal fats, cream and any traditional ingredients used in the manufacture of savoury food compositions. Fat or oil or combination thereof are standard ingredients in food concentrate compositions and contribute generally to the taste and flowable texture of the composition, but also to final food products for which the consumer has made use of the flowable composition in its preparation. Fat is an animal or vegetable fat or combination thereof, preferably the fat is a fat selected from the group consisting of chicken fat or beef fat or combination thereof. Oil is a vegetable oil.

Preferably, the oil is an oil selected from the group consisting of palm oil, palm olein, olive oil, corn oil, sunflower oil, rice bran oil, soybean oil and canola oil, or a combination thereof. In one embodiment the composition further comprises fat or oil or combination thereof as lipids in an amount of 0.5 to 10% (by weight of the total composition), preferably from 0.5 to 8%, more preferably from 1 to 6% (by weight of the total composition).

In one embodiment the amount of water (total amount of moisture present) in the composition is in the range 40 to 70% of the total composition. A preferred range includes 43 to 70%, preferable from 45 to 70%, preferable from 45 to 67%, more preferable from 47 to 65% by weight of the total composition.

The water activity of the product is preferably below 0.9, preferably below 0.85, preferably between 0.6 and 0.85, preferably between 0.7 and 0.85, more preferably between 0.75 and 0.85.

In a still further embodiment, the flavourings are present in the composition in the range of 5 to 30%, preferably from 8 to 25%, preferably from 10 to 23% (by weight of the total composition).

In a still further aspect, the invention relates to a food product comprising the composition, and wherein the food product is a bouillon, condiment, seasoning, sauce, soup, stew, pan-fried dish or gravy.

As used in this specification, the words "comprises", "comprising", and similar words, are not to be interpreted in an exclusive or exhaustive sense. In other words, they are intended to mean "including, but not limited to".

Those skilled in the art will understand that they can freely combine all features of the present invention disclosed herein.

In particular, features described for the composition of the present invention may be combined with the process for the preparation of the composition, and vice versa. Further, features described for different embodiments of the present invention may be combined. Further advantages and features of the present invention are apparent from the examples.

EXAMPLES

The invention is further described with reference to the following examples. It will be appreciated that the invention as claimed is not intended to be limited in any way by these examples.

Example 1

The general procedure for preparing free flowable compositions of the invention is as follows:
  add the first starch to water with mixing at about 50° C.;
  heat the mix to a temperature of at least 90° C. for at least 2 minutes;
  add all other ingredients (including the salt, fat/oil and flavourings);
  heat the mix at a temperature of at least 72° C. for at least 5 minutes in order to pasteurize the mix;
  cool the mix to ca. 40° C.;
  add the second starch with further mixing;
  fill the composition into containers.

Example 2-27

A composition according to the invention was prepared according to the general method as described in Example 1 using the amounts of ingredients in the following table:

| Ingredient (% w/w) | Example 2 Amount [%] | Example 3 Amount [%] | Example 4 Amount [%] | Example 5 Amount [%] | Example 6 Amount [%] |
|---|---|---|---|---|---|
| Added water | 54 | 57.25 | 50.22 | 57.7 | 52.77 |
| Salt | 15.6 | 16.2 | 16.13 | 15.3 | 15.92 |
| First starch | $3^{(1)}$ | $2^{(1)}$ | $3.36^{(1)}$ | $3^{(1)}$ | $3.69^{(1)}$ |
| Second starch | $4^{(2)}$ | $5^{(2)}$ | $5^{(2)}$ | $4^{(2)}$ | $5^{(3)}$ |
| fat/oil | 5 | 1 | 2.52 | 2.6 | 7.38 |
| sugar | 3.6 | 2.98 | 2.40 | 1.05 | 0.79 |
| flavourings | 14.8 | 15.57 | 20.37 | 16.35 | 14.45 |
| Total moisture | 55.29 | 62.55 | 56.12 | 57.21 | 54.18 |
| pH | 3.44 | 4.22 | | | |
| aw | 0.806 | 0.801 | | | |

| Ingredient (% w/w) | Example 7 Amount [%] | Example 8 Amount [%] | Example 9 Amount [%] | Example 10 Amount [%] | Example 11 Amount [%] |
|---|---|---|---|---|---|
| Added water | 52.77 | 52.77 | 52.77 | 52.77 | 52.63 |
| Salt | 15.92 | 15.92 | 15.92 | 15.92 | 15.88 |
| First starch | $3.69^{(1)}$ | $3.69^{(1)}$ | $3.69^{(1)}$ | $3.69^{(1)}$ | $3.68^{(3)}$ |
| Second starch | $5^{(4)}$ | $5^{(5)}$ | $5^{(6)}$ | $5^{(1)}$ | $5^{(2)}$ |
| fat/oil | 7.38 | 7.38 | 7.38 | 7.38 | 7.38 |
| sugar | 0.79 | 0.79 | 0.79 | 0.79 | 0.79 |
| flavourings | 14.45 | 14.45 | 14.45 | 14.45 | 14.63 |
| Total moisture | 54.18 | 54.18 | 54.18 | 54.18 | 56.17 |

| Ingredient (% w/w) | Example 12 Amount [%] | Example 13 Amount [%] | Example 14 Amount [%] | Example 15 Amount [%] | Example 16 Amount [%] |
|---|---|---|---|---|---|
| Added water | 52.63 | 58.51 | 58.51 | 58.51 | 48.51 |
| Salt | 15.88 | 10.00 | 10.00 | 10.00 | 20.00 |
| First starch | $3.68^{(7)}$ | $3.68^{(1)}$ | $3.68^{(1)}$ | $3.68^{(1)}$ | $3.68^{(1)}$ |
| Second starch | $5^{(2)}$ | $5^{(2)}$ | $5^{(3)}$ | $5^{(4)}$ | $5^{(2)}$ |
| fat/oil | 7.38 | 7.37 | 7.37 | 7.37 | 7.37 |

-continued

| | | | | | |
|---|---|---|---|---|---|
| sugar | 0.79 | 0.79 | 0.79 | 0.79 | 0.79 |
| flavourings | 14.63 | 14.65 | 14.65 | 14.65 | 14.38 |
| Total moisture | 56.17 | 59.94 | 59.94 | 59.94 | 49.94 |

| Ingredient (% w/w) | Example 17 Amount [%] | Example 18 Amount [%] | Example 19 Amount [%] | Example 20 Amount [%] | Comp. Example 21 Amount [%] |
|---|---|---|---|---|---|
| Added water | 48.51 | 48.51 | 50.27 | 50.27 | 55.27 |
| Salt | 20.00 | 20.00 | 15.92 | 15.92 | 15.88 |
| First starch | 3.68(1) | 3.68(1) | 3.69(1) | 3.69(1) | 3.68(1) |
| Second starch | 5(3) | 5(4) | 7.5(2) | 7.5(3) | 2.5(2) |
| fat/oil | 7.37 | 7.37 | 7.38 | 7.38 | 7.37 |
| sugar | 0.79 | 0.79 | 0.79 | 0.79 | 0.79 |
| flavourings | 14.38 | 14.38 | 14.45 | 14.45 | 14.88 |
| Total moisture | 49.94 | 49.94 | 51.68 | 51.68 | 56.68 |

| Ingredient (% w/w) | Comp. Example 22 Amount [%] | Comp. Example 23 Amount [%] | Comp. Example 24 Amount [%] | Comp. Example 25 Amount [%] | Comp. Example 26 Amount [%] |
|---|---|---|---|---|---|
| Added water | 47.77 | 52.63 | 52.63 | 52.63 | 52.63 |
| Salt | 15.92 | 15.88 | 15.88 | 15.88 | 15.88 |
| First starch | 3.69(1) | 3.68(8) | 3.68(9) | 3.68(8) | 3.68(9) |
| Second starch | 10(2) | 5(2) | 5(2) | 5(4) | 5(4) |
| fat/oil | 7.38 | 7.38 | 7.38 | 7.38 | 7.38 |
| sugar | 0.79 | 0.79 | 0.79 | 0.79 | 0.79 |
| flavourings | 14.45 | 14.63 | 14.63 | 14.63 | 14.63 |
| Total moisture | 49.18 | 56.17 | 56.17 | 56.17 | 56.17 |

(1)Physically modified corn starch (Novation 2300)
(2)Corn starch
(3)Waxy Rice starch (Remyline XS)
(4)Potato starch
(5)Pea starch
(6)Waxy corn
(7)Physically modified tapioca starch
(8)Tapioca starch
(9)Rice starch Example 27: Texture Analysis The peak positive force measurements of the products were performed after 4 days by uniaxial compression measurements using a texture analyser with the following tooling and settings:

Texture Analyser: TA-XT2, Stable Micro Systems with 5 kg load cell

Probe: Diameter 12.7 mm, height 35 mm, plane surface, sharp edges, material: plastic TA-Parameters: Pre-speed 1 mm/s, test speed 0.5 mm/s, re-speed 10 mm/s, distance 8 mm, Trigger Auto, force 5 g, stop recording at target. Results were taken from the recorded graph force at 8 mm penetration depth (simplified in g). In one embodiment the flowable texture has a peak positive force between 5 to 15 g at a maximum distance of 8 mm, preferably between 6 to 12 g at a maximum distance of 8 mm.

| | Peak positive force (g) |
|---|---|
| Comparison example with commercial available jellified xanthan/carrageenan product | 63.85 ± 2.9 |
| Comparison example with commercial available xanthan/locust bean gum product | 56.09 ± 6.0 |
| Comparison example with Carrageenan/xanthan/ungelatinised starch as described within WO2014/053288 as Example 3 | Above 40 as described on page 15 of WO2014/053288 |

-continued

| | Peak positive force (g) |
|---|---|
| Example 2-22 | 6.75-8.57 ± 1.2 |
| Example 23-26 | Below detection limit of 5 |

Example 28: Dissolution Time in Water at 70° C.

The dissolution time of the free flowable texture of the composition was compared with two commercial available products in form of a gel and with a gel comprising carrageenan/xanthan/un-gelatinized starch. Therefore 150 ml of water has been heated to 70° C. and the time for dissolution was measured in seconds by stirring the solution at 500 rpm. It is clearly shown, that the free flowable composition has a much quicker dissolution time as the jellified commercial available products of xanthan/LBG or xanthan/carrageenan.

| | Dissolution time (sec) |
|---|---|
| Comparison example with commercial available jellified xanthan/carrageenan product | 804 ± 18 |
| Comparison example with commercial available jellified xanthan/locust bean gum product | 168 ± 36 |
| Example 2-26 | 8-11 ± 3 |

Even the dissolution time of the comparison example 22 with 10 wt % of second starch is as fast as the other tested examples it has been shown a much more turbid texture in the prepared bouillon. Additionally there was less fat/oil visible at the surface of the prepared bouillon and the herbs are sinking to the bottom. With all the other examples containing between 2.5-7.5 wt % of second starch a clearer and slightly opaque bouillon can be prepared, showing oil droplets on the surface and also visible herbs on top of the surface. 10 of 10 internal experienced panelists have rated the bouillon with 10 wt % of second starch having the more turbid appearance and no herbs on top of the surface as less liked.

Example 29

The viscosity of the free flowable composition has been measured by using a modular compact Rheometer (Physica MCR 300; measuring system ST24/1D-2V CC27), at a shear rate of 1 s-1 at 25° C.

|  | Viscosity at 1 $(s^{-1})$ at 25° C. |
| --- | --- |
| Example 1-10 | 31.6-34-5 ± 2.5 |
| Example 11 | 40.8 |
| Example 12 | 27.3 |
| Example 15 | 41.9 |
| Example 17 | 39.2 |
| Comparative example 23 | 3.6 |
| Comparative example 24 | 8.2 |
| Comparative example 25 | 8.7 |
| Comparative example 26 | 10.8 |
| Comp. Gel LBG/xanthan | 163.2 |

The comparison examples using a native starch, which is not high resistance to heat and shear, as a first starch deliver compositions that are too thin and too stringy. Example 11 is using a native waxy rice (Remyline XS) starch, which is high resistance to heat and shear. The commercial available product with a gel texture using locust bean gum and xanthan has a viscosity of 163.2 Pa·s at a shear rate of 1 s-1 at 25° C.

Example 30: Method of Pan Frying

Add 2 tablespoons (10 g) of oil into a pan and heat it up at high flame
Add 300 g of chicken pieces cut in 3×3 cm and 300 g of zucchini pieces cut also in 3×3 cm
Cook it at high temperature (150° C.) until it is well cooked.
Add 24 g of the flowable composition and cook it for 2.5 min longer;

Example 31

Different final dishes have been prepared according to the general method as described in Example 33. The cooked dish has been put in a sieve and the amount of sauce dropping in a bowl below has been measured. In addition different composition have been evaluated for its functionality during cooking and for the end/cooked product characteristics in comparison to a commercial available jellified product with locust bean gum/xanthan and in comparison to a composition in form of a gel using carrageenan/xanthan/un-gelatinized starch as described within WO2014/053288 as example 3.
12 internal experienced panelists were used to rate the products.

|  | Gel WO2014/ 053288 Example 3 | Gel LBG/ xanthan | Comp Ex. 21 | Ex. 4 | Ex. 19 | Ex. 14 | Ex. 20 |
| --- | --- | --- | --- | --- | --- | --- | --- |
| Amount of sauce dropping down. | 21.3 g | 23.3 g | 31.1 g | 22.1 g | 15.5 g | 16.2 g | 15.0 g |
| Flowable Texture of composition | - | - | +++ | +++ | +++ | +++ | +++ |
| Natural appearance of composition | 0 Gel doesn't look natural | 0 Gel doesn't look natural | ++ Herbs and spices are better visible | ++ Herbs and spices are better visible | ++ Herbs and spices are better visible | ++ Herbs and spices are better visible | ++ Herbs and spices are better visible |
| Lumps during pan application | + | ++ | − | − | − | − | − |
| Sticking into pan | ++ | + | − | − | − | − | − |
| Coating of final dish | + Some meat coated other not | + Some meat coated other not | − | + Evenly coated | ++ Evenly coated | ++ Evenly coated | ++ Evenly coated |
| Texture of sauce | o Too thick | o Too thick, | − Too liquid | ++ | ++ | ++ | ++ |
| Re-jellification by cooling | − | ++ | − | − | − | − | − |
| Taste/ mouthfeel | + A little slimy sauce | ++ | o | ++ | ++ | ++ | ++ |
| Juiciness of meat | + | + | o | + | ++ | ++ | ++ |

The amount of sauce correlates to the coating effect of the ingredients of the final dish. If the amount of sauce is high, the coating of the ingredients is less and if the amount of sauce is less a very good coating of the ingredients is achieved. Depending on different consumer expectations in different markets a tailored coating of the final dish or the corresponding amount of sauce can be provided. Also the panellists showed that there are no differences between the used starches for the texture of the composition or the behaviour during pan frying. As the composition of the invention melts much quicker also during pan frying compared to a commercial available jellified food product with locust bean gum/xanthan no lumps are observed for the composition of the invention. The composition in form of a gel using carrageenan/xanthan/un-gelatinized starch showed next to the lumps the highest stickiness to the pan during preparation.

The invention claimed is:

1. A composition for preparing a food product, the composition comprising:
   water in an amount of 47 to 65% by weight of the total composition;
   flavorings in an amount of 1 to 30% by weight of the total composition;
   salt in an amount of 10 to 25% by weight of the total composition;
   a gelatinized starch selected from the group consisting of a gelatinized modified starch, a gelatinized waxy rice starch, and a combination thereof; and
   an un-gelatinized starch in an amount of 4 to 7.5% by weight of the total composition,
   wherein the gelatinized starch is 2 to 4% by weight of the total composition,
   wherein the composition has a water activity of 0.75 to 0.85,
   wherein the composition is not a gel and has a flowable texture with a viscosity in the range of 24 to 60 Pa·s at a shear rate of 1s-1 at 25° C., and
   wherein the composition does not include xanthan.

2. The composition according to claim 1, wherein the gelatinized modified starch is a physically modified starch.

3. The composition according to claim 2, wherein the physically modified starch is selected from the group consisting of a physically modified waxy corn starch, a physically modified tapioca starch, a physically modified potato starch, and combinations thereof.

4. The composition according to claim 1, wherein the un-gelatinized starch is selected from the group consisting of an un-gelatinized physically modified starch, an un-gelatinized native starch, and combinations thereof.

5. The composition according to claim 1, wherein the composition further comprises an additional ingredient selected from the group consisting of fat, oil, and combinations thereof.

6. The composition according to claim 5, wherein an amount of the additional ingredient is in the range of 0.5 to 10% by weight of the total composition.

7. The composition according to claim 1, wherein the flowable texture has a peak positive force in the range of 5 to 15 g at a maximum distance of 8 mm.

8. A food product comprising a composition comprising water in an amount of 47 to 65% by weight of the total composition; flavourings in an amount of 1 to 30% by weight of the total composition; salt in an amount of 10 to 25% by weight of the total composition; a gelatinized starch in an amount of 2 to 4% by weight of the total composition; and an un-gelatinized starch in an amount of 4 to 7.5% by weight of the total composition, wherein the composition has a water activity of 0.75 to 0.85, wherein the composition is not a gel and has a flowable texture with a viscosity in the range of 24 to 60 Pa·s at a shear rate of 1s-1 at 25° C., and wherein the composition does not include xanthan.

9. The food product according to claim 8, wherein the food product is selected from the group consisting of a bouillon, condiment, seasoning, sauce, soup, stew, pan-fried dish and gravy.

10. A process for preparing a composition in the form of a flowable texture for preparing a food product, the process comprising:
   a) mixing a gelatinized starch in an amount of 2 to 4% by weight of the total composition in water in an amount of 47 to 65% by weight of the total composition at a temperature below 60° C.;
   b) heating the mixture of step a) to a temperature of at least 85° C. and maintaining the temperature for at least 2 min to cook the gelatinized starch;
   c) adding salt in an amount of 10 to 25% by weight of the total composition and flavourings in an amount of 1 to 30% by weight of the total composition and mixing further;
   d) pasteurizing the mixture of step c) at a temperature of at least 70° C.;
   e) cooling the mixture after pasteurization to a temperature within the range 20° C. to 60° C.; and
   f) adding an un-gelatinized starch in an amount of 4 to 7.5% by weight of the total composition to the mixture of step e) after the cooling, mixing further to form the composition and filling a package with the composition, wherein the composition is not a gel and has a flowable texture with a viscosity in the range of 24 to 60 Pa·s at a shear rate of 1s-1 at 25° C.,
   wherein the composition has a water activity of 0.75 to 0.85, and
   wherein the composition does not include xanthan.

* * * * *